July 25, 1961 O. C. NORTON 2,993,654
FLOW CONTROL FOR FLUIDS AND THE LIKE
Filed Feb. 10, 1959
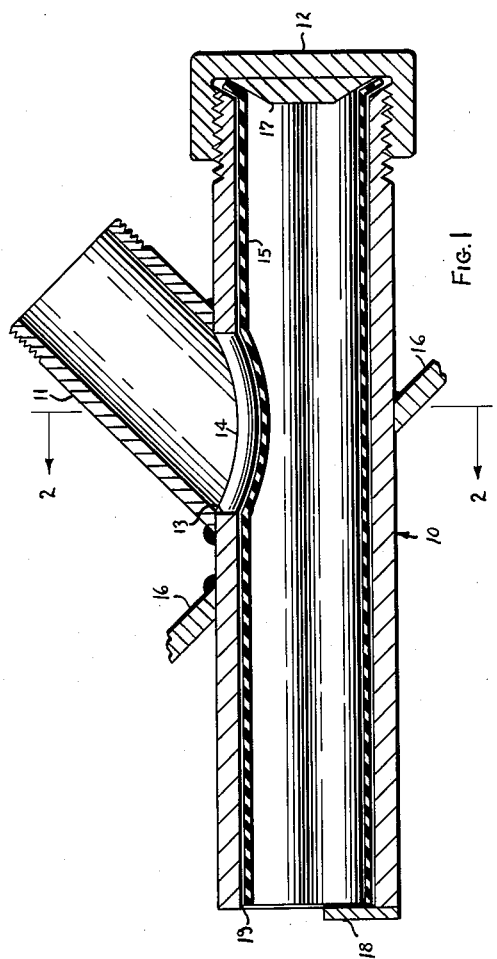
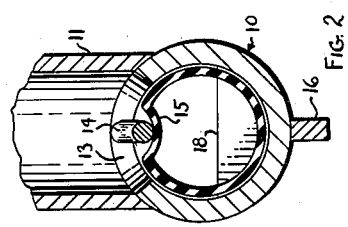
INVENTOR.
ORLO C. NORTON
BY Charles Lorenheck
ATTORNEY

2,993,654
FLOW CONTROL FOR FLUIDS AND THE LIKE
Orlo C. Norton, 544 Virginia Ave., Erie, Pa.
Filed Feb. 10, 1959, Ser. No. 792,381
3 Claims. (Cl. 239—534)

This invention relates to flow controls and, more particularly, to variable orifice type valves to provide fixed pressure drops with variable flow.

In the present invention, a valve consists of a hollow cylindrical body with an opening in the side and is connected to a branch inlet. This opening is spanned by an inwardly curving rod which depresses a flexible liner inserted in the hollow cylindrical body. The liner is held in place by a plug which is retained by a cap. Air enters the inlet, depresses the tube, is compressed, changes in velocity, and emerges at the outlet as a high velocity jet. The change in velocity and pressure causes small particles of water and oil entrained in the air to agglomerate into larger particles which can be separated and filtered from the air stream.

It is, accordingly, an object of the present invention to provide an improved device for removing particles of water and oil from an air stream.

Another object of the invention is to provide an improved variable orifice valve.

A further object of the invention is to provide an improved flow control device.

A still further object of the invention is to provide a flow control device which is simple in construction, economical to manufacture, and simple and efficient in operation.

With the above and other objects in view, the present invention consists of the combination and arrangement of parts hereinafter more fully described, illustrated in the accompanying drawing and more particularly pointed out in the appended claims, it being understood that changes may be made in the form, size, proportions, and minor details of construction without departing from the spirit or sacrificing any of the advantages of the invention.

In the drawing:

FIG. 1 is a longitudinal cross sectional view of a device according to the invention; and FIG. 2 is a cross sectional view taken on line 2—2 of FIG. 1.

Now with more specific reference to the drawing, a valve is shown having a hollow cylindrical body 10 and an inlet pipe 11 connected to the body 10 through an oval shaped orifice 13 and welded thereto. A threaded cap 12 has an inwardly tapering conical plug 17 integrally attached thereto and having outwardly tapering edges.

The hollow body 10 has a flexible tubular liner 15 made of resilient flexible material such as heavy rubber or the like which snugly fits inside the hollow body 10 and conforms to the inside surface thereof. The liner 15 is held in the body 10 by the plug 17 which deflects and, therefore, flares one end of the liner 15 as shown and clamps it between the plug 17 and the threaded end of the pipe.

A stop 18 is welded across part of the outlet end of the pipe and an exhaust for air from the inlet pipe 11 is provided at 19. The opening or orifice 13 of the body 10 has a rod 14 which spans the opening 13 and is curved downwardly to depress the liner 15 as shown so that the liner 15 is held and deformed slightly as shown in FIG. 2.

A brace 16 is welded to the body 10 as shown and this may be used to attach the flow control to a support member and, therefore, support the flow control.

When a pipe line is connected to the threaded end of the inlet pipe, thereby connecting the device in a flow line, the end having the stop 18 being supported inside of a water separating device, and when air pressure is applied to the inlet pipe 11, the air will impinge on the portion of the flexible liner 15 exposed by the opening 13 adjacent the rod 14 and will deflect the flexible liner 15. Air will escape between the liner 15 and the body 10 to the exhaust 19. The air will expand and its pressure will change rapidly as it exhausts at 19. Therefore, a high velocity jet will result and the sudden change in velocity and pressure will cause small particles of water and oil to agglomerate into larger particles whereby they can be separated from the air stream by suitable means.

The foregoing specification sets forth the invention in its preferred practical forms but it is understood that the structure shown is capable of modification within a range of equivalents without departing from the invention which is to be understood is broadly novel as is commensurate with the appended claims.

The embodiments of the invention in which an exclusive property or privilege is claimed are defined as follows:

1. A valve for changing the direction and velocity of a gas to agglomerate water and oil and the like comprising a hollow, tubular, rigid body closed at one end and having an inlet comprising a laterally disposed opening in said body intermediate said end and an outlet at the end opposite said closed end, a flexible tubular member concentrically disposed in said hollow body and conforming tightly to the inside surface thereof, said inlet communicating with the open end of said body when gas under pressure deflects said flexible tubular member away from the inside surface of said body, and a curved rod extending diametrically across said laterally disposed opening and attached at its ends to the sides thereof, said rod engaging said flexible tubular member and distorting it inwardly away from said rigid body.

2. The valve recited in claim 1 wherein said closed end is closed by means of a cap having a plug on the inside thereof, said plug clamping said tubular member between the end of said hollow body and said plug.

3. The valve recited in claim 1 wherein said inlet comprises a tube connected to said opening and disposed at an acute angle to the axis of said tubular member.

References Cited in the file of this patent

UNITED STATES PATENTS

| 2,114,977 | Edwards | Apr. 19, 1938 |
| 2,534,874 | Mettler | Dec. 19, 1950 |
| 2,621,889 | Annin | Dec. 16, 1952 |
| 2,651,322 | Hendry | Sept. 8, 1953 |
| 2,662,485 | Ilfrey | Dec. 15, 1953 |
| 2,760,436 | Von Seggern | Aug. 28, 1956 |
| 2,890,838 | Jannsen | June 16, 1959 |

FOREIGN PATENTS

| 23,990 | Austria | Apr. 25, 1906 |
| 1,058,147 | France | Nov. 4, 1953 |